UNITED STATES PATENT OFFICE.

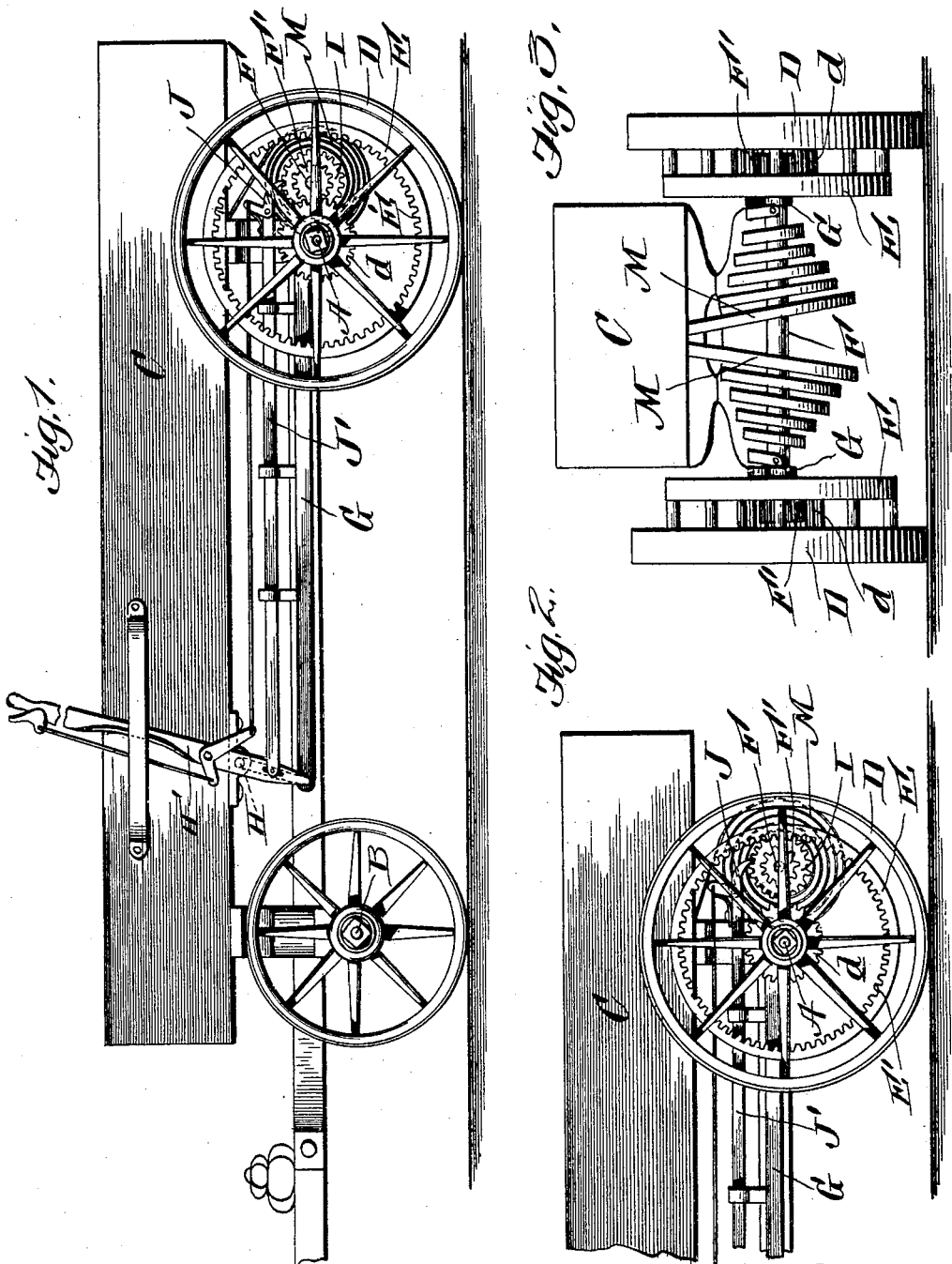

WRIGHT WILLIAM CAIN, OF KOSCIUSKO, MISSISSIPPI.

WAGON ATTACHMENT.

No. 809,488.  Specification of Letters Patent.  Patented Jan. 9, 1906.

Application filed September 13, 1905. Serial No. 278,280.

*To all whom it may concern:*

Be it known that I, WRIGHT WILLIAM CAIN, a citizen of the United States, residing at Kosciusko, in the county of Attala and State of Mississippi, have invented certain new and useful Improvements in Wagon Attachments; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in wagon attachments adapted for use as a brake mechanism for a vehicle in going downgrade and as a mechanism for assisting in the propelling of the vehicle upon an upgrade, and comprises a coiled spring or springs designed to be put under tension upon going downgrade which serve as a brake to the vehicle, while the springs which are held under tension may be caused to exert a power through gear mechanism with the wheels to assist in propelling the same on an upgrade.

The invention comprises various details of construction and combinations and arrangements of parts, which will be hereinafter fully described and then specifically defined in the appended claims.

My invention is illustrated in the accompanying drawings, which, with the letters of reference marked thereon, form a part of this application, and in which—

Figure 1 is a side elevation showing my invention as applied to a vehicle with the apparatus in gear with the hub of a wheel. Fig. 2 is a similar view showing the apparatus in gear with mechanism for utilizing the tension of the springs for assisting in propelling the vehicle, and Fig. 3 is a rear end view in elevation.

Reference now being had to the details of the drawings by letter, A designates the rear axle of a vehicle, and B the forward axle, having suitable bolsters thereon and supporting a box C. Wheels D are mounted upon the rear axle, and the hubs of the wheels D have series of cog-teeth $d$ formed upon the circumferences about their inner ends. Each wheel D has fixed thereto a ring E, the inner circumference of which is provided with gear-teeth E', said ring being fastened to each rear wheel a slight distance therefrom.

F designates a shaft having fixed at each end thereof a gear-wheel F', each of which is designed to be thrown into and out of mesh with the teeth upon the hub of a wheel D, and G designates longitudinally-movable bars which have a play upon the upper edges of the rear axle, and the rear end of each of said bars is provided with suitable journal-bearings in which the shaft F is mounted.

H designates a crank-shaft which is journaled in suitable bearings upon the bottom of the box, and to the crank portions of said shaft are journaled the forward ends of the bars G. One of said cranks is extended to form a lever H', whereby an operator may conveniently cause the crank-shaft to rock for the purpose of imparting longitudinal movements to the bars G, which will tend to throw the gear-wheels F' either toward the hubs of the wheels D or toward the gear-rings E.

Fixed adjacent to each gear-wheel F' is a gear-wheel I of larger diameter than the gear-wheel F', and J is a pawl adapted to rest upon one of said gear-wheels I and provided for the purpose of allowing the same to rotate in one direction only. Said pawl is fixed to the end of a rod J', and the forward end of said rod is fastened to a lever N, which is pivoted to the forward portion of the bar G and so positioned that it will be convenient for an operator to raise or lower the pawl by the swinging of the lever, whereby a shaft F, which may be under tension, may be allowed to rotate in a manner presently to be described.

Fastened to the rear portion of the running-gear of the vehicle are the coiled springs M M, corresponding ends of which are fastened to the bolster and their outer ends fastened to said shaft F. The springs are designed to coil about the shaft a considerable number of times and are of such a strength that when wound will exert quite a force upon the shaft F and cause the same to rotate in one direction as the springs uncoil.

The operation of my apparatus is as follows: In going down a grade the operator by actuating the hand-lever connected to the crank-shaft may cause the gear-wheels F' to be thrown into mesh with the teeth of the hubs of the rear wheels, and through the connections with the shaft F the latter will be rotated in one direction, which will cause the springs to wind or come under tension. In this operation a brake force is imparted to the rear wheels, and the springs may be held under tension by means of the pawl which rides upon the teeth of one of the large gear-wheels I and hold the springs under tension. As the vehicle approaches a level at the bottom of an incline the operator may cause the gear-wheels F' to be thrown out of mesh with the teeth upon the hubs of the wheels, and the tension of each spring is held in reserve until the vehicle comes to a hill up which it has to ascend, at which time the operator by throwing the gear-wheels I in mesh with the teeth of the gear-rings and releasing the pawl from the gear-wheel I will allow the force of the springs as they uncoil to exert their power in assisting in driving the rear wheels through the medium of the gear-rings which are connected thereto.

It will be noted from the foregoing that a simple and efficient means is provided which may be utilized as a brake by the winding of the springs and the utilization of the power of the springs for assisting the vehicle in going up an incline.

Having thus fully described my invention, what I claim as new, and desire to secure by Letters Patent, is—

1. In combination with a vehicle having wheels mounted upon the axles thereof, the hubs of the rear axles of the vehicle having gear-teeth upon their circumferences, a shaft, springs secured at their ends to the gear of the vehicle and to said shaft, gear-wheels fixed to said shaft and adapted to be thrown into mesh with the gear-teeth of said hub, whereby said shaft may be rotated to bring said springs under tension, gear-rings fastened to the rear wheels of the vehicle and having teeth on their inner marginal edges, gear-wheels carried by said shaft and adapted to engage the teeth of said gear-rings, and means for throwing said gear-wheels into and out of mesh with the gear-teeth upon said hubs and rings, as set forth.

2. In combination with a vehicle having wheels mounted upon the axles thereof, the hubs of the rear axles of the vehicle having gear-teeth upon their circumferences, a shaft, springs secured at their ends to the gear of the vehicle and to said shaft, gear-wheels fixed to said shaft and adapted to be thrown into mesh with the gear-teeth of said hub, whereby said shaft may be rotated to bring said springs under tension, gear-rings fastened to the rear wheels of the vehicle and having teeth on their inner marginal edges, gear-wheels carried by said shaft and adapted to engage the teeth of said gear-rings, longitudinally-movable bars in which said shaft has a bearing, and means for moving said bars, whereby said gear-wheels may be thrown into and out of mesh with the gear-teeth upon said hubs and the teeth of said rings, as set forth.

3. In combination with a vehicle having wheels mounted upon the axles thereof, the hubs of the rear axles of the vehicle having gear-teeth upon their circumferences, a shaft, springs secured at their ends to the gear of the vehicle and to said shaft, gear-wheels fixed to said shaft and adapted to be thrown into mesh with the gear-teeth of said hub, whereby said shaft may be rotated to bring said springs under tension, gear-rings fastened to the rear wheels of the vehicle and having teeth on their inner marginal edges, gear-wheels carried by said shaft and adapted to engage the teeth of said gear-rings, longitudinally-movable bars in which said shaft has a bearing, a crank-shaft mounted upon the vehicle and to which said bars are pivotally connected, a portion of said shaft forming a lever for rocking the same, and means for holding the shaft from rotation when out of gear, as set forth.

4. In combination with a vehicle having wheels mounted upon the axles thereof, the hubs of the rear axles of the vehicle having gear-teeth upon their circumferences, a shaft, springs secured at their ends to the gear of the vehicle and to said shaft, gear-wheels fixed to said shaft and adapted to be thrown into mesh with the gear-teeth of said hub, whereby said shaft may be rotated to bring said springs under tension, gear-rings fastened to the rear wheels of the vehicle and having teeth on their inner marginal edges, gear-wheels carried by said shaft and adapted to engage the teeth of said gear-rings, longitudinally-movable bars in which said shaft has a bearing, a crank-shaft mounted upon the vehicle and to which said bars are pivotally connected, a portion of said shaft forming a lever for rocking the same, a pawl riding upon one of the gear-wheels, a rod to which said pawl is connected, and a lever connected to one of said bars and to which said rod is fastened, as set forth.

In testimony whereof I hereunto affix my signature in the presence of two witnesses.

WRIGHT WILLIAM CAIN.

Witnesses:
J. W. BLACK,
M. J. SPAIN.